United States Patent
Grady

(10) Patent No.: US 8,270,690 B2
(45) Date of Patent: Sep. 18, 2012

(54) ACCELERATED IMAGE VOLUME SEGMENTATION USING MINIMAL SURFACES GIVEN A BOUNDARY

(75) Inventor: Leo Grady, Yardley, PA (US)

(73) Assignee: Siemens Aktiengesellschaft, München (DE)

( * ) Notice: Subject to any disclaimer, the term of this patent is extended or adjusted under 35 U.S.C. 154(b) by 1130 days.

(21) Appl. No.: 11/876,847

(22) Filed: Oct. 23, 2007

(65) Prior Publication Data

US 2008/0226169 A1    Sep. 18, 2008

Related U.S. Application Data

(60) Provisional application No. 60/894,472, filed on Mar. 13, 2007.

(51) Int. Cl.
    *G06K 9/00* (2006.01)
(52) U.S. Cl. .......... 382/128; 382/131; 382/172
(58) Field of Classification Search ............ 382/128
    See application file for complete search history.

(56) References Cited

U.S. PATENT DOCUMENTS

| | | | | |
|---|---|---|---|---|
| 6,078,688 A * | 6/2000 | Cox et al. | ........ | 382/173 |
| 7,111,225 B2 * | 9/2006 | Coene et al. | ........ | 714/792 |
| 7,545,979 B2 * | 6/2009 | Fidrich et al. | ........ | 382/173 |
| 7,561,725 B2 * | 7/2009 | Liang | ........ | 382/128 |
| 7,680,641 B1 * | 3/2010 | Tarjan et al. | ........ | 703/13 |

OTHER PUBLICATIONS

A. V. Goldberg, E. Tardos, and R. E. Tarjan. Network flow algorithms. In B. Korte, L. Lovasz, H. Proemel, and A. Schrijver, editors, Paths, Flows and VLSI-Design, vol. 9 of Algorithms and Combinatorics, pp. 101-164. Springer-Verlag, 1990.

L. Grady. Computing exact discrete minimal surfaces: Extending and solving the shortest path problem in 3D with application to segmentation. In IEEE Computer Society Conference on Computer Vision and Pattern Recognition—CVPR 2006, vol. 1, pp. 69-78. IEEE, IEEE, Jun. 2006.

V. Kolmogorov. Primal-dual algorithm for convex Markov random fields. Technical Report MSR-TR-2005-117, Microsoft, Sep. 2005.

E. Mortensen and W. Barrett. Interactive segmentation with intelligent scissors. Graphical Models in Image Processing, 60(5): 349-384, 1998.

J. M. Sullivan. A Crystalline Approximation Theorem for Hypersurfaces. PhD thesis, Princeton University, Princeton, NJ, Oct. 1990.

* cited by examiner

*Primary Examiner* — Philip A Johnston

(74) *Attorney, Agent, or Firm* — Donald B. Paschburg; F. Chau & Associates, LLC

(57) ABSTRACT

A method for image volume segmentation includes receiving an input image, obtaining an oriented closed contour on one or more slices of the input image, determining a minimum-weight surface from the oriented closed contour using a minimum-cost circulation network flow, and outputting the minimum-weight surface as a segmentation of the input image.

10 Claims, 3 Drawing Sheets

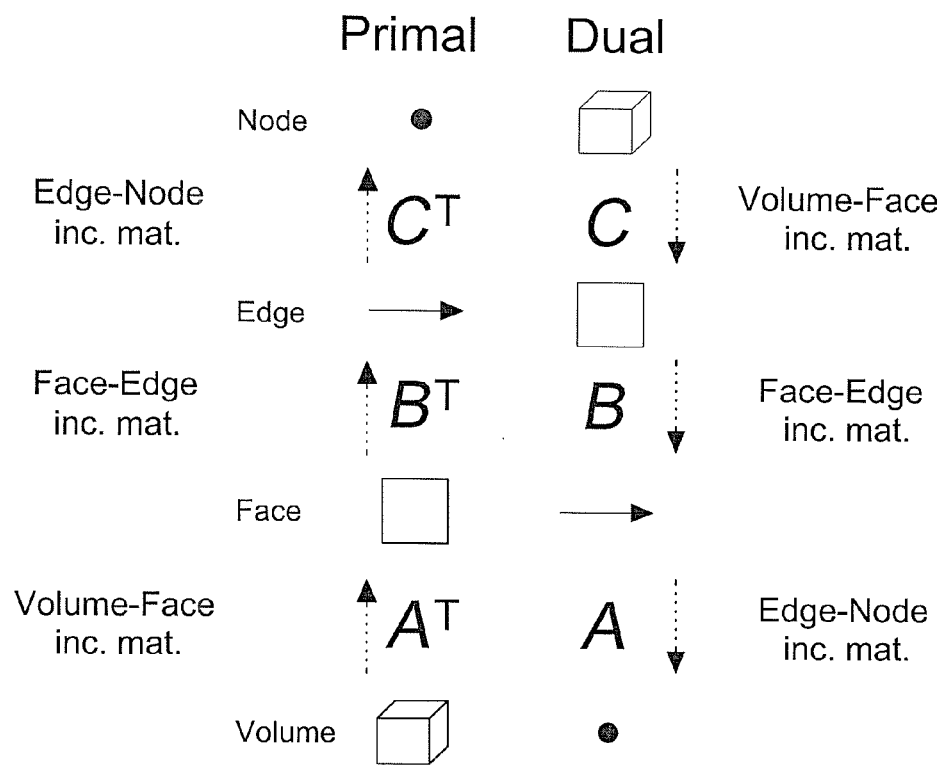
FIG. 1
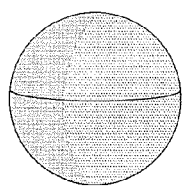 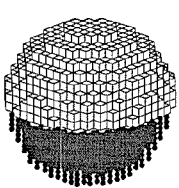 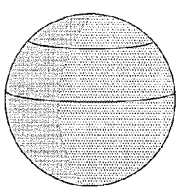 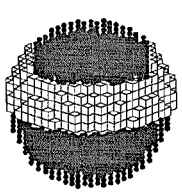 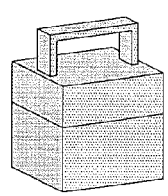 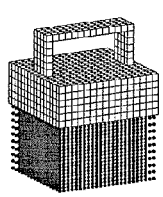
FIG. 2A  FIG. 2B  FIG. 2C  FIG. 2D  FIG. 2E  FIG. 2F

ACCELERATED IMAGE VOLUME SEGMENTATION USING MINIMAL SURFACES GIVEN A BOUNDARY

CROSS-REFERENCE TO RELATED APPLICATION

This application claims priority to U.S. Provisional Application Ser. No. 60/894,472, filed on Feb. 13, 2007, which is herein incorporated by reference in their entirety.

BACKGROUND OF THE INVENTION

1. Technical Field

The present invention relates to image volume segmentation, and more particularly to a system and method for image volume segmentation using surfaces given a boundary.

2. Discussion of Related Art

Variations of the intelligent scissors method find the minimal (1D) surface on a 2D weighted graph, given user-indicated pieces of the boundary. This algorithm has been very popular in both the research community and commercially due to its simplicity and effectiveness. Although several attempts have been made to extend the approach to 3D volume segmentation, all of them have so far have had serious problems with sampling or object topology. A new method of exactly extending the popular intelligent scissors algorithm to 3D has been published. Although this new method overcomes the problems of previous methods, it is computationally slow.

Therefore, a need exists for a system and method for image volume segmentation.

SUMMARY OF THE INVENTION

According to an embodiment of the present disclosure, a method for image volume segmentation, the method includes receiving an input image, obtaining an oriented closed contour on one or more slices of the input image, defining face weights from the input image, identifying a surface having a desired boundary based on the face weights, determining a minimum-cost circulation through the surface, determining a minimum-weight surface having the boundary as a set of saturated edges in a primal graph corresponding to faces, given by the oriented closed contour and the minimum-cost circulation, and outputting the minimum-weight surface as a segmentation of the input image.

According to an embodiment of the present disclosure, a system for image volume segmentation comprises a memory device storing a plurality of instructions embodying the system for image volume segmentation, a processor for receiving an input image and executing the plurality of instructions to perform a method comprising obtaining an oriented closed contour on one or more slices of the input image, defining face weights from the input image, identifying a surface having a desired boundary based on the face weights, determining a minimum-cost circulation through the surface, determining a minimum-weight surface having the boundary as a set of saturated edges in a primal graph corresponding to faces, given by the oriented closed contour and the minimum-cost circulation, and outputting the minimum-weight surface as a segmentation of the input image.

According to an embodiment of the present disclosure, a method for image volume segmentation comprises receiving an input image, obtaining an oriented closed contour on one or more slices of the input image, determining a minimum-weight surface from the oriented closed contour using a minimum-cost circulation network flow, and outputting the minimum-weight surface as a segmentation of the input image.

BRIEF DESCRIPTION OF THE DRAWINGS

Preferred embodiments of the present invention will be described below in more detail, with reference to the accompanying drawings:

FIG. 1 shows a comparison of incidence matrices in a primal and dual 3D lattice according to an embodiment of the present disclosure; and FIGS. 2A-B show a sphere having an input contour and an image volume segmentation, respectively, according to an embodiment of the present disclosure;

FIGS. 2C-D show a sphere having two input contours and an image volume segmentation, respectively, according to an embodiment of the present disclosure;

FIGS. 2E-F show a box having a handle and a medial input contour and an image volume segmentation, respectively, according to an embodiment of the present disclosure;

DETAILED DESCRIPTION OF EXEMPLARY EMBODIMENTS

Figure 3:
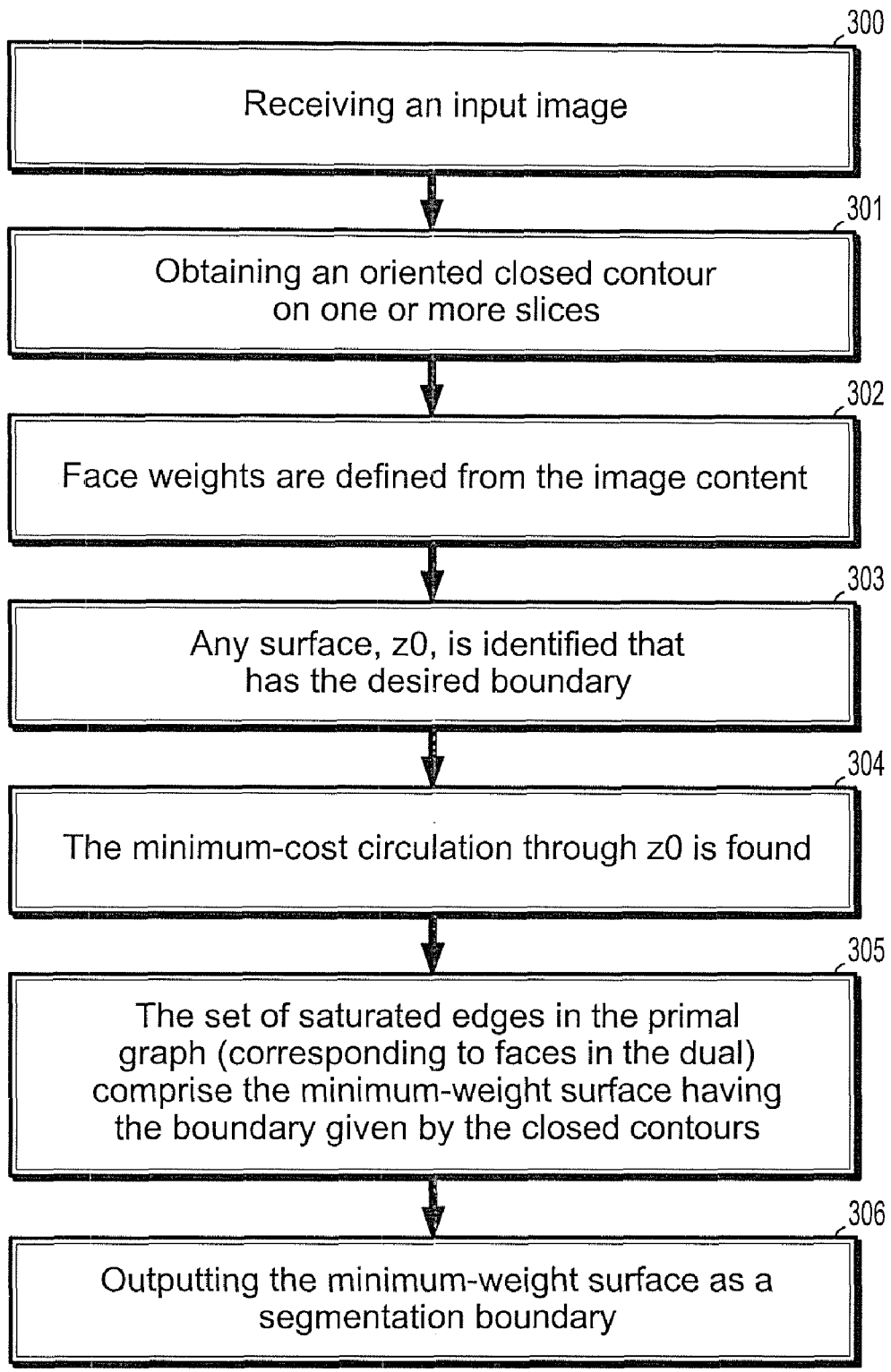
FIG. 3 is a flow chart of a method for image volume segmentation according to an embodiment of the present disclosure.

According to an embodiment of the present disclosure, Intelligent scissors is a very popular and widely used method of image segmentation in 2D images. However, most attempts to extend this technique to 3D using surface interpolation of paths have been unsatisfactory, due to problems with sampling or topology. Our previous approach to this problem overcomes the aforementioned obstacles, but requires the solution to a large Linear Programming problem, which is computationally slow. Herein, a method is described for accelerating the speed of image segmentation without sacrificing the quality of the results.

2D, intelligent scissors methods have been proposed having the following steps:

1. Generate a graph representing the image, where pixels are identified with nodes and edges connect local pixels in an 8-connected lattice.
2. Generate weights for the graph based on local intensity differences (see (1)).
3. From a user, obtain two points (pixels) on the boundary of the object to be segmented.
4. Compute a shortest path between the two points to obtain a section of the boundary.
5. Repeat steps 3-4 until the entire boundary is produced.

This approach applies only to 2D image segmentation, since the shortest path provides a section of a 2D boundary. This procedure may be generalized to 3D, but the method of computation was slow. For interactive 3D segmentation the following method may be used:

1. Generate a 3D graph representing the image, where voxels are identified with nodes and edges connect local voxels in a 6-connected 3D lattice.
2. Generate weights for the graph based on local intensity differences (see (1)).
3. From a user, obtain a 2D segmentation on one or more slices of the 3D object to be segmented.
4. Solve a linear programming problem to find the minimal surface between the 2D closed contours.
5. Repeat steps 3-4 until the entire boundary in produced.

In the present work, we propose to replace the time-consuming 3rd step with a fast Minimum-cost Circulation Network Flow (MCNF) computation to obtain the minimal surface. The procedure for performing this computation will now be detailed.

Referring to an extension of the shortest path problem: for purposes of the description, the primal and dual complexes will be three-dimensional, 6-connected lattices. Define a three dimensional lattice complex includes a set $P=(V,E,F,C)$ with vertices (nodes) $v \in V$, edges $e \in E \subset V \times V$, faces $f \in F \subset E \times E \times E \times E$ and cubes (volumes) $c \in C \subset \overline{F \times F \times F \times F \times F \times F}$ (since we will be dealing exclusively with 6-connected lattices). Let $n=|V|$ and $m=|E|$, where $|\cdot|$ denotes cardinality. Nodes, edges, faces and cubes will all be indexed by single subscripts. A weighting assigns a value to each edge called a weight. The weight of an edge, $e_i$, is denoted by $w_i$ and considered in this work to be nonnegative.

An oriented complex is one for which each structure is additionally assigned an ordering of its constituent vertices. Intuitively, the orientation corresponds to a "direction" of an edge or a "clockwise" or "counterclockwise" orientation of a face. A face and a bordering edge are said to have coherent orientation if the ordering given by the edge orientation is found in the orientation of the face. In standard texts, the orientation is defined by a notion of "parity" in the vertex ordering. Unfortunately, this definition does not apply to the degenerate simplices that compose a 6-connected lattice (i.e., squares instead of triangles). For our purposes, consider an orientation of a face, represented by column b indicating a signed membership of each edge to the face, as valid if $Ab=0$, where A is defined in (4). Note that the edges may be assigned arbitrary orientation, but subsequent higher-order complexes (faces, volumes) have orientation chosen to agree with the above definition. Clearly, b may take a positive or negative sign while fulfilling this condition, which may be interpreted here as opposite orientations. Intuitively, a face is coherently oriented with a bordering edge if the edge "points" in the same direction as the "clockwise" or "counterclockwise" traversal of the face.

In the context of image processing, nodes are associated with data elements (e.g., pixels, voxels) and the edges define a neighborhood relation. For our purposes, the 6-connected lattice is taken to have a face on every "square" of the lattice. Orientations must be assigned consistently, but may be assigned arbitrarily. An example orientation would be to orient all edges to point from nodes with smaller coordinates to nodes with larger coordinates and to orient each face in a clockwise manner (relative to a particular view of the lattice).

Although the above definition applies to the standard 6-connected lattice found in computer vision, all of thought embodiments described herein may be applied to more general complexes. Using an embodiment of the formulation described herein, it is possible to find a minimum-weight surface on a general cell complex defined by stating that for each dimension $k \leq d$, for maximum dimension d, there is a set $C_k$ of k-dimensional cells (homeomorphic to balls), such that all the cells are disjoint and the boundary of any k-cell is the union of a finite number of lower dimensional balls. If each (d-1)-dimensional facet bordering a d-dimensional cell is part of the boundary of exactly two d-dimensional cells, then the minimum-weight hypersurface may be found using methods described herein, since such a complex is dual (isomorphic) to a graph in which d-dimensional cells are mapped to nodes and (d-1)-dimensional facets are mapped to edges and, consequently, the d-(d-1)-incidence matrix is totally unimodular.

Graph-based segmentation algorithms typically focus on partitioning a weighted graph, with weights given on the primal edges via a function of the image intensity, e.g., $$w_i = \exp(-\beta(I_j - I_k)^2) \text{ for } \{v_j, v_k\} \in e_i \quad (1)$$

where $I_j$ indicates the image (volume) intensity at voxel $v_j$.

The minimum path problem may be viewed as the solution to the optimization problem $$\min_y Q(y) = \sum_i w_i y_i, \quad (2)$$

where $y_i$ represents an indicator vector on the set of edges, with $y_i=1$ indicating that edge $e_i$ belongs to the path and $y_i=0$ indicating that edge $e_i$ does not belong to the path.

In the absence of constraints, the solution of (2) yields a vector of $y_i=0 \forall e_i \in E$, since all weights are nonnegative. An algebraic formulation of the endpoint constraints for the shortest path computation may be given by $$Ay=p, \quad (3)$$

where p is a vector of all zeros except for a $p_s=1$ and $p_t=-1$, for endpoints $\{v_s, v_t\}$. The matrix A is the node-edge incidence matrix $$A_{v,e} = \begin{cases} +1 & \text{if the vertex appears first in the edge orientation,} \\ -1 & \text{if the vertex appears second in the edge orientation,} \\ 0 & \text{otherwise.} \end{cases} \quad (4)$$

The node-incidence matrix in (3) plays the role of the boundary operator. In this case, the boundary operator inputs an edge path (indicated by y) and returns the nodal boundary of that path (fixed by p).

In order to pass from minimal paths to minimum-weight surfaces, the dimensionality of the above formulation needs to be increased. The dimensionality of the minimal path problem may be increased simply by using the dimension-appropriate incidence matrix (boundary operator) and boundary vector p. This dimension-increased shortest path problem therefore asks the question: Given the boundary of a two-dimensional surface (i.e., a closed contour or series of closed contours), find the minimum-weight two-dimensional surface with the prescribed boundary. As desired, this is the minimum weight surface problem with boundary conditions.

In this dimension-increased problem, the incidence matrix (boundary operator) in question is the edge-face incidence matrix defined as $$B_{e,f} = \begin{cases} +1 & \text{if the edge borders the face} \\ & \text{with coherent orientation,} \\ -1 & \text{if the edge borders the face with} \\ & \text{anticoherent orientation,} \\ 0 & \text{otherwise.} \end{cases} \quad (5)$$

Instead of the lower-dimension boundary vector, p, the vector r is employed as an indicator vector of a closed, oriented contour taking values $$r_i = \begin{cases} +1 & \text{if the edge } e_i \text{ belongs to the contour} \\ & \text{with coherent orientation,} \\ -1 & \text{if the edge } e_i \text{ belongs to the contour} \\ & \text{with anticoherent orientation,} \\ 0 & \text{otherwise.} \end{cases} \quad (6)$$

Therefore, the minimum-weight surface problem is $$\min_z Q(z) = \sum_i w_i z_i, \quad (7)$$

subject to $Bz = r$, where z is an indicator vector indicating whether or not a face is present in the minimum weight surface and $w_i$ is meant to indicate the weights of a face. Since the faces in the dual lattice correspond to edges in the primal lattice (where the image data is located), (1) may be used to produce the set of face weights.

The solution of (7) is used to generate the desired segmentation, which solves the minimum-weight surface problem described by (7) without resorting to an NP integer programming method.

Referring to the determination of the Minimum-cost Circulation Network Flow (MCNF); (7) may be viewed as representing a second linear programming problem. Recall that this second linear programming problem may be solved efficiently using a specialty solver.

If the RHS of (7) is generated by any surface, represented by z0, then $$r = Bz_0 \quad (8)$$

Therefore, the constraint in (7) may be rewritten as;

$$Bz = Bz_0 \quad (9)$$

which reveals that $$B(z-z_0) = 0 \quad (10)$$

$$Cx = z - z_0 \quad (11)$$

for some matrix C representing the nullspace of B. The entire optimization problem of (7) may be recast in terms of this new variable x, as $$\min_x w^T(Cx + z_0), \quad (12)$$

s.t. $-Cx = z_0 - z \le z_0,$ $x \ge 0.$

This inequality may be asserted since the nullspace of Ck=0 for any constant vector k. In other words, by assuming that there exists an integer solution to (7), the initial integer programming problem of (7) may be transformed into a second integer programming problem, (12). The new question is, under what circumstances can one apply linear programming (i.e., allow x to vary over the reals) to (12) and guarantee an integer solution? Clearly, if (12) is guaranteed to take an integer solution, and C is integer, then $z = Cx + z_0$ is integer.

FIG. 1 shows a comparison of incidence matrices in the primal and dual 3D lattice. The incidence matrix mapping a d-dimensional complex to a (d-1)-dimensional complex in the dual lattice equals the transpose of the incidence matrix mapping the (3-(d-1))-dimensional complex to a (3-d)-dimensional complex in the primal lattice. For this reason, it may be seen that the volume-face incidence matrix of the dual lattice (in which we are working) equals the edge-node incidence matrix in the primal lattice. Since any edge-node incidence matrix is totally unimodular, and total unimodularity is preserved under the transpose operation, the face-edge incidence matrix in our dual lattice is also totally unimodular.

A boundaryless set of faces (i.e., enclosing a volume), represented by indicator vector c0 would necessarily take a zero if the boundary operator were applied, i.e., Bc0=0. A basis set of such ci vectors would then generate the columns of the nullspace C. The matrix C maps volumes to faces and is well known to be the volume face incidence matrix. In the case of the 6-connected lattice in a 3D image, each volume is identified directly with a voxel. If the volumes are such that each face is shared by exactly two volumes, incident with opposite orientation, then C can be seen to be the edge-node incidence matrix of another complex, specifically the primal complex, where each volume is identified with a node and each edge is identified with a face (shared by two volumes in the manner than an edge is shared by two nodes). When each face in the complex is shared by exactly two volumes, as in the case of a 6-connected 3D lattice, then C is an edge-node incidence matrix and is therefore, necessarily, totally unimodular. Consequently, for our purposes, (12) is guaranteed to produce an integer solution and therefore our original integer programming problem of (7) is guaranteed to produce an integer solution when linear programming is applied. The identification of incidence matrices in the primal and dual lattices is illustrated in FIG. 1.

Either of the two integer programming problems introduced here may be directly solved by generic linear programming software when it is the case that the volumes share exactly two faces. Since the 6-connected, 3D lattice satisfies this condition, one can employ generic linear programming to solve the minimum-weight surface problem in 3D image processing. We note that our initial focus on the 6-connected lattice was due to the ability to define a straightforward dual. However, the problem in (12) could be easily solved on a primal graph with higher order connectivity. Since the relationship between (12) and (7) becomes less clear with a higher-order connectivity, a 6-connected lattice is employed throughout this disclosure.

Although the problems defined by (7) or (12) may be solved with a generic LP solver, it is possible to apply a specialty solver to (12) that yields an even faster solution. Beginning by forming the dual LP problem to (12) in terms of variable f $$\max_f z_0^T f, \quad (13)$$

s.t. $C^T f \le C^T w,$ $f \ge 0.$ the solution f is decomposed into the sum of two vectors $f + \hat{f} + f'$ such that $$C^T \hat{f} = C^T w, \quad (14)$$

$$C^T f' = 0. \quad (15)$$

If $\hat{f}$ is treated as a constant and f' as the variable to be optimized over, it is possible to reconstruct any solution f. In this case, the most convenient choice for $\tilde{f}$ is $\tilde{f}=w$, allowing the optimization problem of (13) to be rewritten in terms of the variable f' as $$\max_{f'} z_0^T f', \quad (16)$$
$$\text{s.t.} \quad C^T f' = 0,$$
$$f' \le \tilde{f} = w.$$

In prose, this optimization problem seeks a maximum divergence-free flow, on the edges of the primal graph, that passes through the initial surface, $z_0$, with capacities given by the graph weights. As (16) represents the dual to the problem, it is the saturated set of primal edges (dual faces) that comprise the desired minimum surface solution. The optimization described by (16) is the MCNF problem, which may be solved using a variety of existing algorithms. The timings herein were generated using a primal-dual MCNF algorithm without Dijkstra computations.

The MCNF approach represents the best known algorithm for solving an LP problem of the form (12), and consequently for computing the 3D minimum-weight surface on real data, given one or more surface boundaries. The MCNF approach to solving (12) represents a primal-dual algorithm to the linear programming problem.

According to an embodiment of the present disclosure, the generalization of the shortest path problem to the minimum-weight surface problem may be solved through the application of an MCNF problem. This algorithm inputs a closed contour (or series of closed contours) and returns a minimum-weight surface. Since closed contours are the output of standard (2D) intelligent scissors, the outputs of the 2D intelligent scissors gives inputs for a 3D intelligent scissors. Alternately, any 2D segmentation algorithm could also be used to produce the inputs to the minimum-weight surface problem.

Referring to FIG. 3 and according to an embodiment of the present disclosure, a segmentation algorithm for segmented an input image 300 may be given by: obtaining an oriented closed contour on one or more slices through an outside algorithm (e.g., 2D intelligent scissors) 301. This contour is represented in (7) by vector r. Face weights are defined from the image content using (1) 302. Note that "outside" faces must be assigned to an arbitrary value—here w=0.5 Any surface, z0, is identified that has the desired boundary 303. The minimum-cost circulation through z0 (corresponding to solving (16)) is found 304. In block 305, the set of saturated edges in the primal graph (corresponding to faces in the dual) comprise the minimum-weight surface having the boundary given by the closed contours obtained in block 301. The minimum-weight surface is output, e.g., to a memory device, display, etc., as a segmentation boundary 306.

Three examples have been performed to demonstrate correctness. A black sphere (in a white background) was segmented, given an initial contour around one parallel. The same sphere was segmented using a boundary including contours around two parallels (i.e., a contour given on two slices). A "lunchbox" shape was segmented given a medial contour. This experiment shows that the algorithm correctly handles changes in object genus.

FIGS. 2A-F shows the results of these three experiments, verifying the correctness of the algorithm. In contrast to the shortest path problem in which two points are needed to define a path, FIG. 2A shows that a single closed contour is sufficient to define the boundary of a surface.

FIGS. 2A-F are synthetic examples to illustrate correctness of an implementation of a method according to an embodiment of the present disclosure. Renderings of the original object (with the input contours) are shown, along with the algorithm outputs. The input volumes all had black voxels indicating voxels belonging to the object and white voxels indicating background. The white stripe in each of the rendered views shows the input contour(s). In the solution visualizations, black dots are plotted at the center of the black (object) voxels and faces are shown to indicate the computed surface. FIGS. 2A-B show a sphere with an input contour along a parallel. Note that, unlike 2D intelligent scissors, a single boundary input (contour) is sufficient to define a solution. FIGS. 2C-D show a sphere with input contours at two parallels of different heights. FIGS. 2E-F show a lunchbox shape with a handle on the top and a medial contour input. A method according to an embodiment of the present disclosure will correctly find minimum-weight surfaces with topological changes.

The above examples were solved using a generic LP solver. Using the generic LP solver to obtain a solution for the LP problem on a 64°-64°-64 lattice representing FIG. 2A needed 819 seconds when run on an IBM ThinkPad T42 laptop with a 1.70 GHz processor and 512 MB of RAM. In contrast using an accelerated, MCNF-based, solver according to an embodiment of the present disclosure needed 0.55 seconds to obtained a solution on the same machine.

By using an efficient MCNF solver, a high quality segmentation result can be obtained, but at speeds that are greater by several orders of magnitude than related methods.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 4:
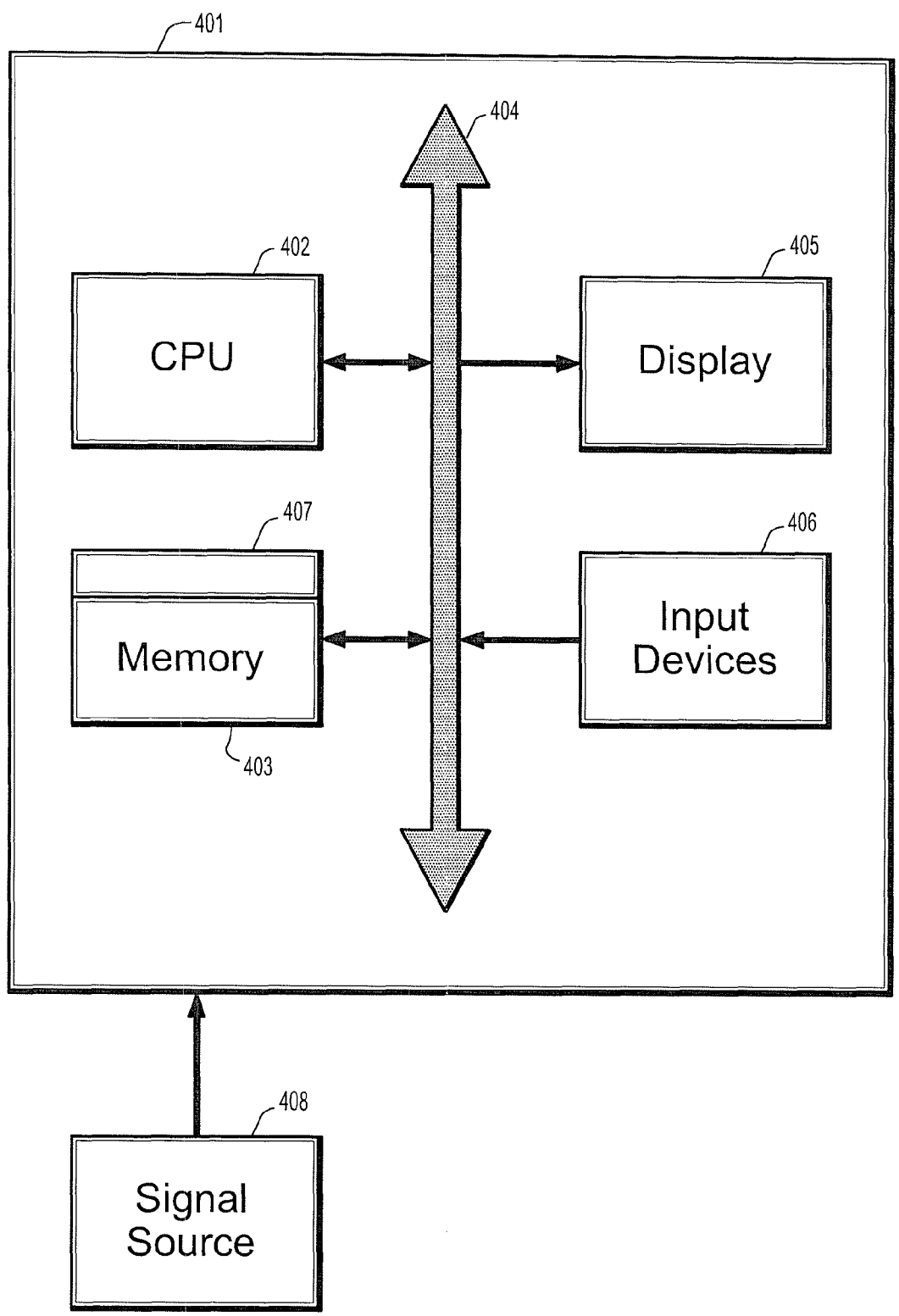
FIG. 4 is a diagram of a system according to an embodiment of the present disclosure.

Referring to FIG. 4, according to an embodiment of the present invention, a computer system 401 for image volume segmentation comprise, inter alia, a central processing unit (CPU) 402, a memory 403 and an input/output (I/O) interface 404. The computer system 401 is generally coupled through the I/O interface 404 to a display 405 and various input devices 406 such as a mouse and keyboard. The support circuits can include circuits such as cache, power supplies, clock circuits, and a communications bus. The memory 403 can include random access memory (RAM), read only memory (ROM), disk drive, tape drive, etc., or a combination thereof. The present invention can be implemented as a routine 407 that is stored in memory 403 and executed by the CPU 402 to process a signal, e.g., a closed surface mesh, from the signal source 408. As such, the computer system 401 is a general purpose computer system that becomes a specific purpose computer system when executing the routine 407 of the present invention. The computer system 401 may further include a GPU 409 for processing certain operations.

The computer platform 401 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Having described embodiments for a system and method for image volume segmentation, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A computer readable medium embodying instructions executed by a processor to perform a method for image volume segmentation, the method steps comprising:
   receiving an input image;
   forming a primal 6-connected lattice of edges and a dual 6-connected lattice of faces defining an object in the input image, wherein the faces in the dual 6-connected lattice correspond to edges in the primal 6-connected lattice, wherein the edges in the primal 6-connected lattice connect voxels of the input image;
   obtaining one or more oriented closed contours on respective slices of the input image;
   defining a face weight for each of the faces of the dual 6-connected lattice based on a function of image intensities of the voxels of a corresponding edge;
   identifying a surface of the input image having an initial boundary based on the face weights;
   determining a three-dimensional minimum-weight surface including the initial boundary as a set of saturated edges in the primal 6-connected lattice of edges corresponding to a minimum-cost circulation network flow, wherein the minimum-weight surface is a three-dimensional segmentation of a portion of the object with the one or more oriented closed contours defining a boundary of the three-dimensional minimum-weight surface determination; and
   outputting the three-dimensional minimum-weight surface as a segmentation of the input image.

2. The computer readable medium of claim 1, further comprising obtaining a series of closed contours.

3. The computer readable medium of claim 1, wherein the oriented closed contour is represented by a vector r in the determination of the three-dimensional minimum-weight surface given by:

$$\min_z Q(z) = \sum_i w_i z_i,$$

subject to $Bz = r$, where z is an indicator vector indicating whether a face is present in the three-dimensional minimum weight surface and $w_i$ indicates the weights of a face.

4. The computer readable medium of claim 1, wherein the oriented closed contour is obtained by a two-dimensional segmentation method.

5. The computer readable medium of claim 1, wherein the face weights include an arbitrary value for outside faces.

6. A system for image volume segmentation comprising:
   a memory device storing a plurality of instructions embodying the system for image volume segmentation;
   a processor for receiving an input image and executing the plurality of instructions to perform a method comprising:
      forming a primal 6-connected lattice of edges and a dual 6-connected lattice of faces defining an object in the input image, wherein the faces in the dual 6-connected lattice correspond to edges in the primal 6-connected lattice;
      obtaining an oriented closed contour on one or more slices of the input image;
      defining a face weight for each of the faces of the dual 6-connected lattice based on a function of image intensities of the voxels of a corresponding edge;
      identifying a surface of the input image having an initial boundary based on the face weights;
      determining a three-dimensional minimum-weight surface including the initial boundary as a set of saturated edges in the primal 6-connected lattice of edges corresponding to a minimum-cost circulation network flow, wherein the minimum-weight surface is a three-dimensional segmentation of a portion of the object with the one or more oriented closed contours defining a boundary of the three-dimensional minimum-weight surface determination; and
      outputting the three-dimensional minimum-weight surface as a segmentation of the input image.

7. The system of claim 6, further comprising obtaining a series of closed contours.

8. The system of claim 6, wherein the oriented closed contour is represented by a vector r in the determination of the three-dimensional minimum-weight surface given by:

$$\min_z Q(z) = \sum_i w_i z_i,$$

subject to $Bz = r$, where z is an indicator vector indicating whether a face is present in the three-dimensional minimum weight surface and $w_i$ indicates the weights of a face.

9. The system of claim 6, wherein the oriented closed contour is obtained by a two-dimensional segmentation method.

10. The system of claim 6, wherein the face weights include an arbitrary value for outside faces.

* * * * *